Patented June 5, 1928.

1,672,689

UNITED STATES PATENT OFFICE.

JOSEPH ROSIN, OF PHILADELPHIA, PENNSYLVANIA, ASSIGNOR, BY MESNE ASSIGN-MENTS, TO MERCK AND COMPANY, INC., OF RAHWAY, NEW JERSEY, A CORPORATION OF NEW YORK.

PARA-ALKYL-OXYPHENYLGLYCINAMIDES AND METHOD OF PREPARING THE SAME.

No Drawing. Application filed July 22, 1926. Serial No. 124,289.

My invention relates to new organic chemical compounds having desirable characteristics and to the methods of making the same, more particularly it relates to the group of compounds known as the para-alkyl-oxyphenylglycinamides.

One object of my invention is to provide a new series of organic alkyl derivatives of oxyphenylglycinamide which will be of use in the arts, particularly as medicinal preparations. Another object is to furnish a relatively non-toxic compound with strong anti-pyretic and analgesic properties. Other objects will be apparent from the specification and claims.

As far as I am aware, no compound of the class designated by para-alkyl-oxphenyl-glycinamides has been reported in the literature. The term "alkyl" as used throughout the specification and claims has its generally accepted meaning and the compound, para-ethoxyphenylglycinamide, may be given as a typical example, although the methyl, propyl, allyl derivatives and the like are contemplated. These compounds might also be known by other names, such as para-alkyl-oxyphenylaminoacetamide. The formula of these compounds is given below, the R joined to the oxygen in the para position represents the alkyl group.

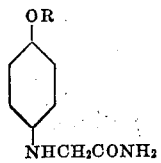

These compounds have very desirable properties and are adaptable for use in the medical field. For example the ethoxy derivative is substantially non-toxic and possesses valuable anti-pyretic and analgesic properties. It may be used per se or in conjunction with other medicinal compounds.

The method of preparation that I have found to give good yields involves the condensation of a para-alkyl-oxyaminobenzene with a halogenated compound derived from acetic acid, for example, the chloracetamide or the ethylchloracetate. If the former is used the product will be obtained directly, while if ethylchloracetate is employed subsequent treatment with ammonia is necessary.

The reactions that take place in the preparation of the para-alkyl-oxyphenylglycinamide are as follows:

*Condensation of para-alkyl-oxyaminobenzene with chloracetamide.*

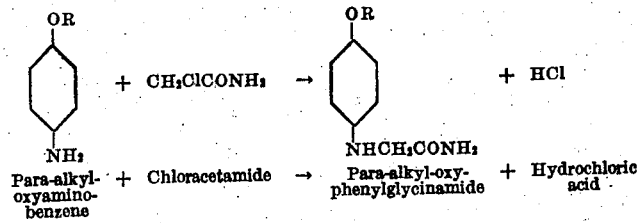

*Condensation of para-alkyl-oxyaminobenzene with ethylchloracetate and subsequent treatment with ammonia.*

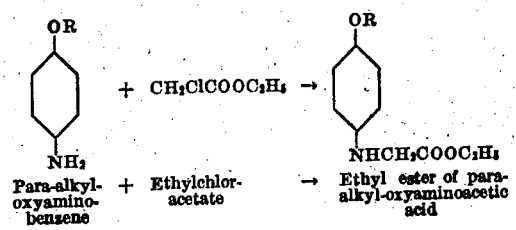

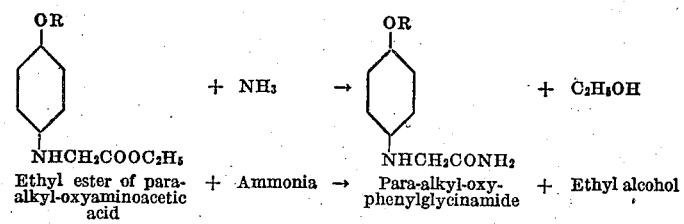

Ethyl ester of para-alkyl-oxyaminoacetic acid + Ammonia → Para-alkyl-oxy-phenylglycinamide + Ethyl alcohol In the above formulæ, R stands for the alkyl radical.

In a typical case for the preparation of para-ethoxy-phenylglycinamide or para-ethoxyphenylaminoacetamide, I dissolve 100 grams of para-phenetidin (para-ethoxyaminobenzene) in a suitable organic solvent such as acetone or alcohol. To this solution is added 116 grams of chloracetamide and the mixture placed under a reflux condenser. From time to time, sodium bicarbonate is added in order to neutralize the hydrochloric acid set free by the condensation until approximately 60 grams of this neutralizer has been added. It is heated for a few hours, cooled and then diluted with water and allowed to stand over night. The product para-ethoxyphenylglycinamide separates out and is filtered. The product may be purified by the process of re-crystallization. By the method described above, I have obtained yields as high as 85% or even more. The reaction will take place without the addition of the acid neutralizers, although the yields will be smaller.

In the production of my new compound, para-ethoxyphenylglycinamide, by the use of ethylchloracetate, 100 grams of para-phenetidin are dissolved in a solvent such as alcohol and 110 grams of ethylchloracetate are added. The solution is heated under a reflux condenser for a few hours with the fractional addition of an antacid to neutralize the hydrochloric acid as it is formed. As in the preceding example, any neutralizer will serve the purpose, such for example as sodium bi-carbonate. Also in this process, the reaction will take place without the addition of an antacid but with correspondingly lower yields. The resulting compound, the ethyl ester of para-ethoxyphenylaminoacetic acid, separates as an oil when the solution of alcohol is treated with water. This oil is then treated with ammonia water or by passing a stream of gaseous ammonia through the oil previously suspended in a little water, which results in the formation of the para-ethoxyphenylglycinamide and ethyl alcohol.

Para-ethoxyphenylglycinamide is a white crystalline solid with a melting point, when pure, of 142–145° C. It is sparingly soluble in cold water and benzol, more soluble in hot water, and very soluble in alcohol and acetone. The compound dissolves in acids forming salts, but decomposes in the presence of strong alkali.

While I have discussed particularly the preparation of para-ethoxyphenylglycinamide and described in detail its properties, my invention is not limited to this compound for as hereinbefore pointed out, the invention contemplates the preparation of a new group of chemicals, para-alkyl-oxyphenylglycinamides, as well as the methods of preparation of these compounds. Considerable modifications in the methods of preparing the compounds, in the proportions used, and in the methods of using the same are possible with no departure from the essential features of my invention.

I claim:

1. The preparation of a para-alkyl-oxyphenylglycinamide which involves the condensation of a para-alkyl-oxyaminobenzene with a halogenated compound derived from acetic acid.

2. The preparation of a para-alkyl-oxyphenylglycinamide which involves the condensation of a para-alkyl-oxyaminobenzene with chloracetamide.

3. The preparation of para-ethoxyphenylglycinamide which involves the condensation of para-phenetidin with a halogenated compound derived from acetic acid.

4. The preparation of para-ethoxyphenylglycinamide which involves the condensation of para-phenetidin with chloracetamide.

5. The preparation of a para-alkyl-oxyphenylglycinamide which involves the condensation of a para-alkyl-oxyaminobenzene with a halogenated compound derived from acetic acid and during the reaction neutralizing the halogen acid as it is formed.

6. The preparation of para-ethoxyphenylglycinamide which involves the condensation of para-phenetidin with chloracetamide and during the reaction neutralizing the hydrochloric acid as it is formed.

7. A medicinal preparation comprising a para-alkyl-oxyphenylglycinamide.

8. A medicinal preparation comprising para-ethoxyphenylglycinamide.

JOSEPH ROSIN.